(12) United States Patent
Park

(10) Patent No.: US 12,425,542 B2
(45) Date of Patent: Sep. 23, 2025

(54) COLLABORATIVE USER INTERFACE AND SYSTEMS AND METHODS FOR PROVIDING SAME

(71) Applicant: Yum Connect, LLC, Louisville, KY (US)

(72) Inventor: Joseph R. Park, Plano, TX (US)

(73) Assignee: Yum Connect, LLC, Louisville, KY (US)

( * ) Notice: Subject to any disclaimer, the term of this patent is extended or adjusted under 35 U.S.C. 154(b) by 262 days.

(21) Appl. No.: 17/933,027

(22) Filed: Sep. 16, 2022

(65) Prior Publication Data

US 2023/0086055 A1 Mar. 23, 2023

Related U.S. Application Data

(60) Provisional application No. 63/245,701, filed on Sep. 17, 2021.

(51) Int. Cl.
*H04N 7/15* (2006.01)
*H04L 9/32* (2006.01)
*H04N 7/14* (2006.01)

(52) U.S. Cl.
CPC .............. *H04N 7/15* (2013.01); *H04L 9/3213* (2013.01); *H04N 7/147* (2013.01)

(58) Field of Classification Search
CPC ........................ H04N 7/147; H04N 7/15–157; H04L 9/3213; H04L 12/1813–1831; G06F 3/048; G06Q 10/101
See application file for complete search history.

(56) References Cited

U.S. PATENT DOCUMENTS

| | | | |
|---|---|---|---|
| 11,507,925 B1 * | 11/2022 | Chenicheri | G06Q 50/12 |
| 2013/0212182 A1 | 8/2013 | Jhang et al. | |
| 2014/0052485 A1 * | 2/2014 | Shidfar | G06Q 50/01 705/7.13 |
| 2015/0081773 A1 | 3/2015 | Ansel et al. | |

(Continued)

OTHER PUBLICATIONS

International Search Report and Written Opinion issued Dec. 8, 2022 regarding International Application No. PCT/US2022/076651, 9 pages.

(Continued)

*Primary Examiner* — Liang Y Li
(74) *Attorney, Agent, or Firm* — Foley & Lardner LLP

(57) ABSTRACT

Systems and methods for using collaborative objects across a plurality of networked devices includes launching, at a first electronic device, a first instance of a collaborative user interface (UI), wherein the first instance of the collaborative UI is presented at a display of the first electronic device in conjunction with a video conferencing application, sending local constraint information of the first electronic device to a connection manager server. The method includes receiving from the connection manager server, data associated with a collaborative object, wherein the data associated with the collaborative object comprises a local constraint information of a second electronic device or a first control input received through a second instance of the collaborative UI launched at the second electronic device and displaying, through the first instance of the collaborative user interface, a token of the collaborative object.

20 Claims, 10 Drawing Sheets

(56) References Cited

U.S. PATENT DOCUMENTS

| | | | |
|---|---|---|---|
| 2015/0350604 A1* | 12/2015 | Roy | H04N 7/155 |
| | | | 348/14.09 |
| 2016/0027216 A1* | 1/2016 | da Veiga | G06F 3/013 |
| | | | 345/158 |
| 2016/0140789 A1* | 5/2016 | Wickersham, III | H04W 4/021 |
| | | | 705/12 |
| 2019/0164217 A1* | 5/2019 | Agrawal | G06Q 10/101 |
| 2019/0182616 A1* | 6/2019 | Kamath | H04L 67/306 |
| 2020/0184217 A1* | 6/2020 | Faulkner | G06T 7/50 |
| 2020/0344327 A1* | 10/2020 | Calvo Lance | G06N 20/00 |
| 2021/0374884 A1* | 12/2021 | Cupid | G06Q 10/1095 |
| 2022/0239513 A1* | 7/2022 | Swierk | G06V 40/18 |
| 2022/0391851 A1* | 12/2022 | Panikkar | G06Q 50/12 |
| 2023/0254412 A1* | 8/2023 | Jorasch | H04N 7/147 |
| | | | 709/204 |

OTHER PUBLICATIONS

PCT Int Preliminary Report and WO dtd Mar. 28, 2024 re PCT Appl PCT/US2022/076651.

\* cited by examiner

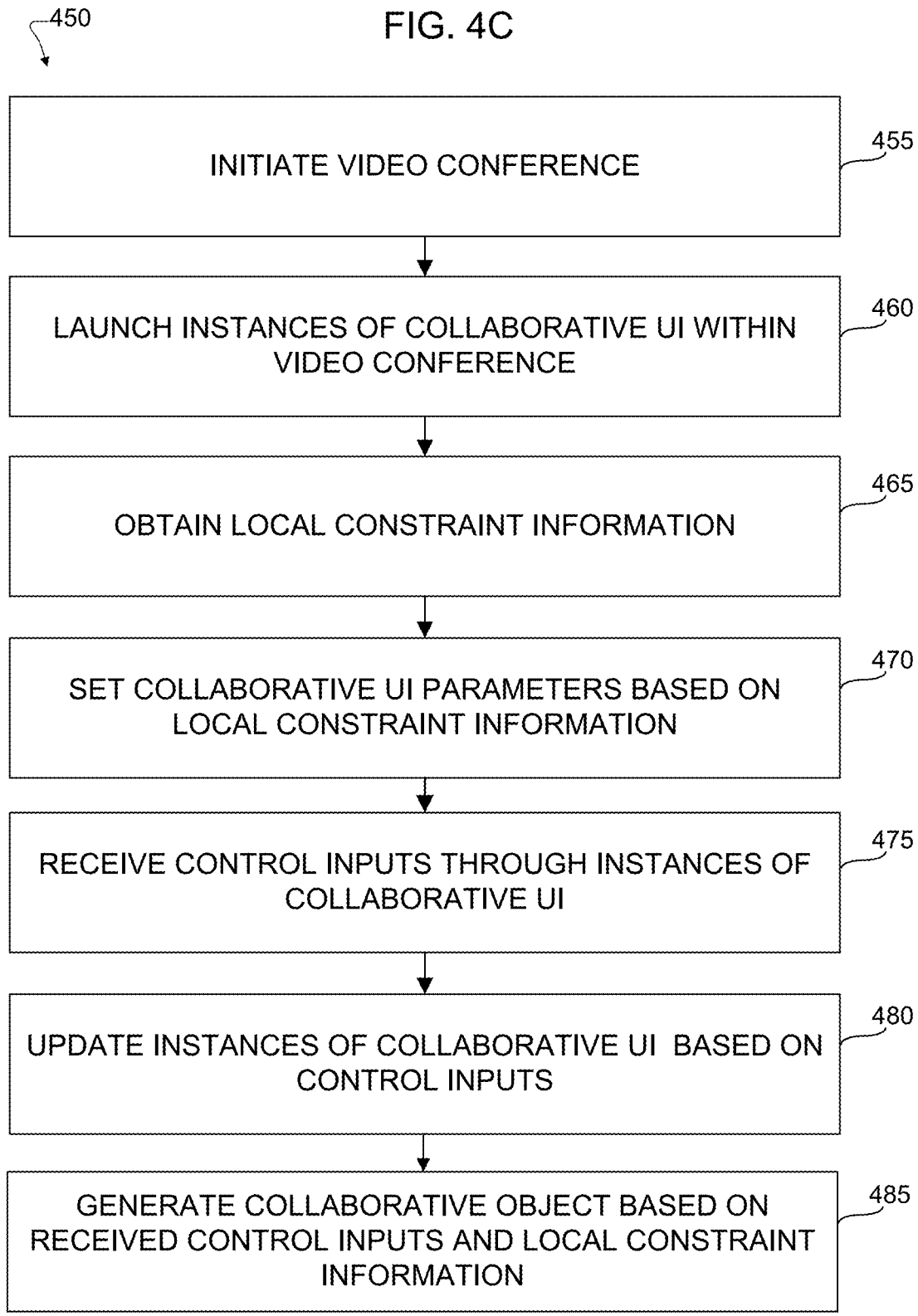

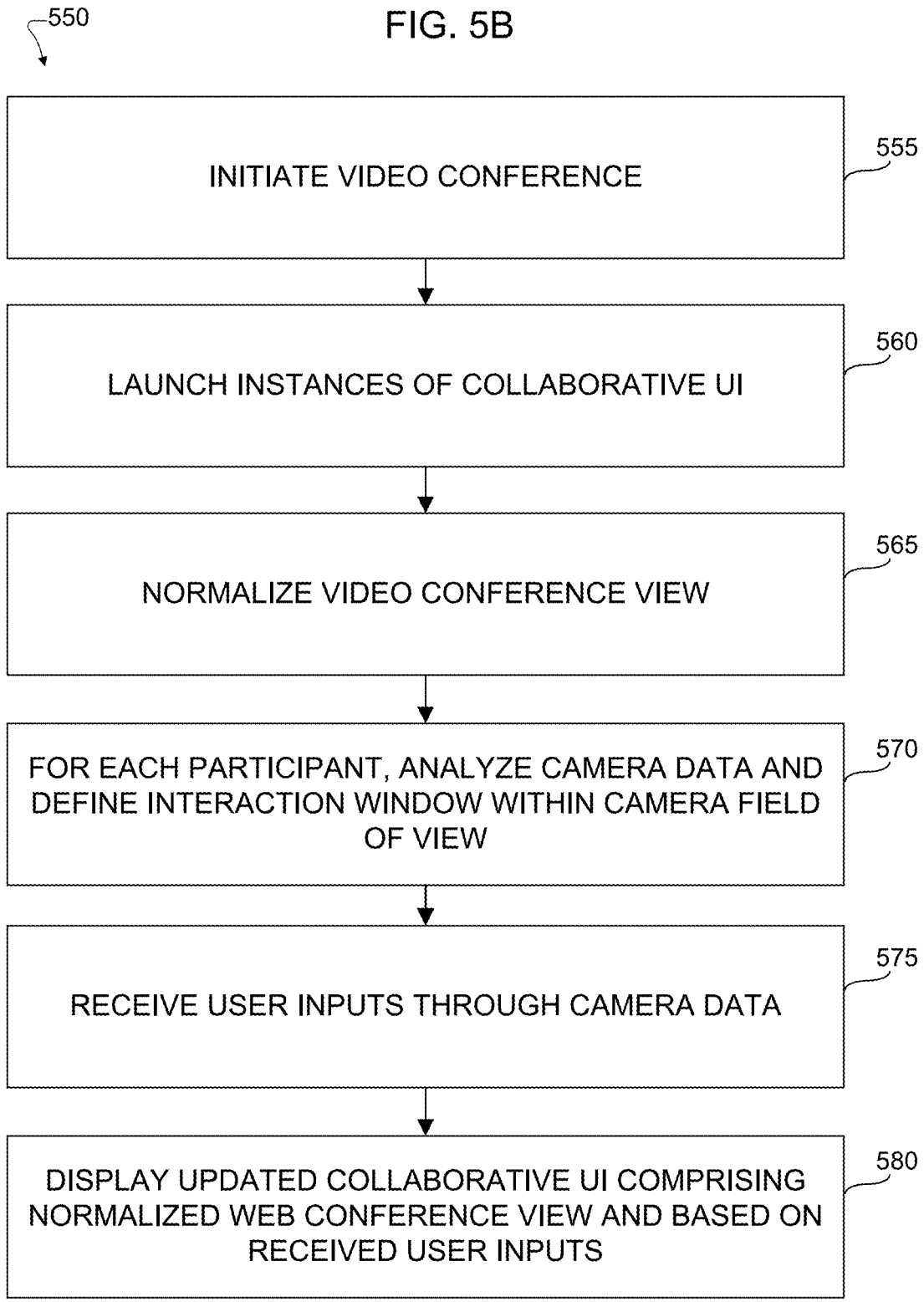

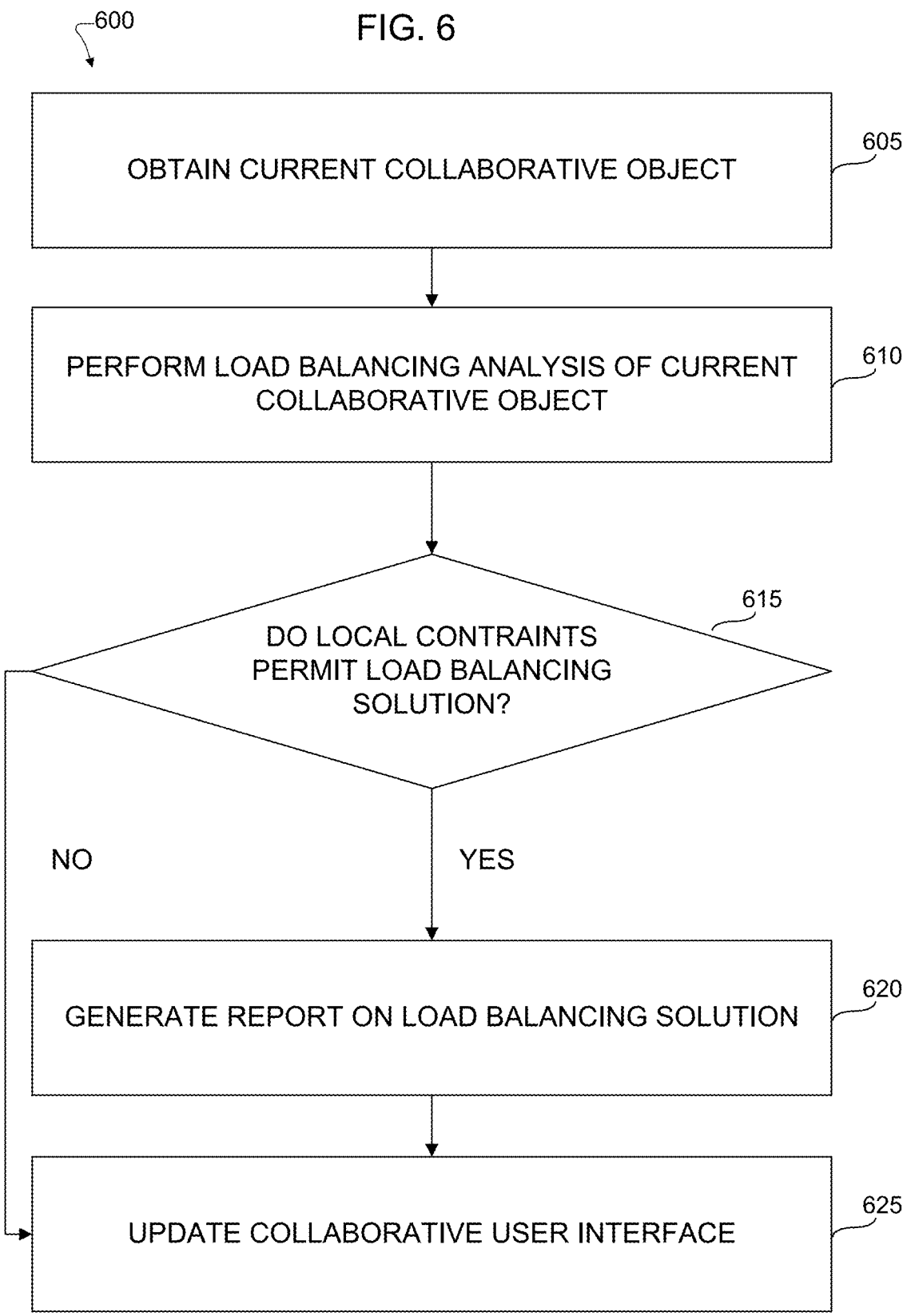

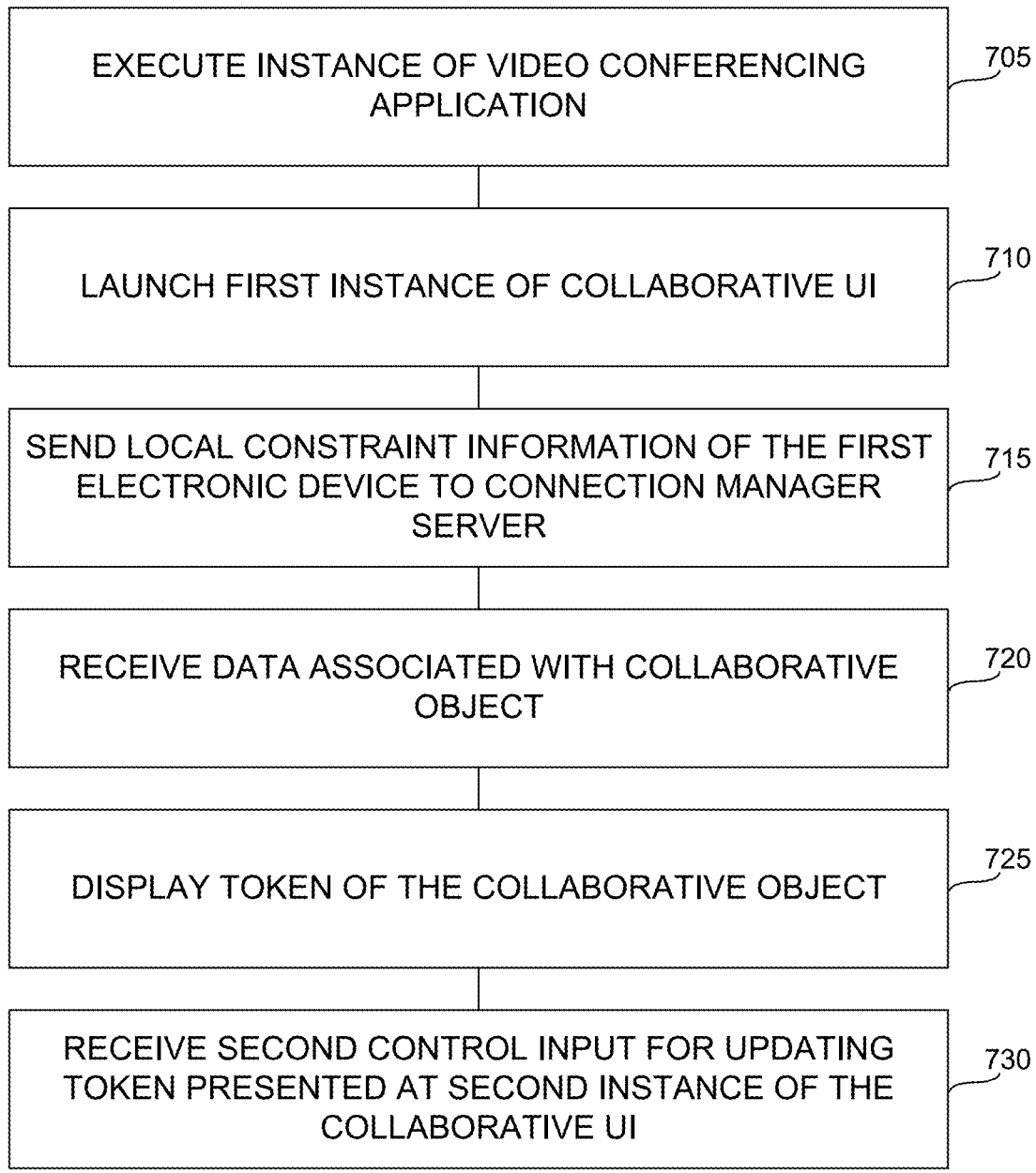

COLLABORATIVE USER INTERFACE AND SYSTEMS AND METHODS FOR PROVIDING SAME

CROSS-REFERENCE TO RELATED APPLICATION AND CLAIM OF PRIORITY

This application claims priority under 35 U.S.C. § 119(e) to U.S. Provisional Patent Application No. 63/245,701 filed Sep. 17, 2021, the contents of which are incorporated by reference in their entirety herein.

TECHNICAL FIELD

This disclosure relates generally to web-based voice and video communications and specifically, to collaborative user interfaces and systems and methods for providing same.

BACKGROUND

Thanks to improvements in available bandwidth, messaging platforms (for example, smartphones and notebook computers) and external and cultural factors, video conferencing has, for many users, evolved from its status as a niche product (as compared to voice or email communications), to a default medium for personal and professional communications. As real-time video has evolved and expanded as a communication medium, so too have the technical challenges associated with providing multi-party video chat. In addition to longstanding problems such as minimizing latency and tuning video quality to support a satisfactory chat experience, the technical challenges in the video chat space now also include the challenges associated with enriching the video chat experience and providing functionalities beyond the "talking pictures" provided by existing video conferencing platforms. Given that developing video conferencing products requires engineering software and platform which can handle a wide variety of variables beyond the control of any video conferencing platforms, such as the speed and quality of the participants' local network connections, differences in the participants' interaction with the system (for example, different users posing further or closer to a camera, thereby providing different amounts of processable image data), and other local factors (for example, government regulations), extending the functionality of video conferencing platforms beyond presents a significant source of technical challenges and opportunities for improvement in the art.

SUMMARY

This disclosure provides collaborative user interfaces and systems and methods for providing same.

In a first embodiment, a method for using collaborative objects across a plurality of networked devices includes, at a first electronic device of a plurality of electronic devices connected to a connection manager server, executing an instance of a video conferencing application, wherein the video conferencing application obtains first image data and first audio data from the electronic device and transmits the obtained first image data and first audio data to the connection manager server. The method further includes launching, at the first electronic device, a first instance of a collaborative user interface (UI), wherein the first instance of the collaborative UI is presented at a display of the first electronic device in conjunction with the video conferencing application and sending local constraint information of the first electronic device to the connection manager server. Additionally, the method includes receiving from the connection manager server, data associated with a collaborative object, wherein the data associated with the collaborative object comprises at least one of local constraint information of a second electronic device or a first control input received through a second instance of the collaborative UI launched at the second electronic device and displaying, through the first instance of the collaborative user interface, a token of the collaborative object. The method also includes receiving, through the first instance of the collaborative user interface, a second control input for updating the token of the collaborative object displayed at the second instance of the collaborative UI.

In a second embodiment, a first electronic device includes an audio sensor, an image sensor and a processor. The processor is configured to connect to a connection management server communicatively connected to a plurality of electronic devices, execute an instance of a video conferencing application, wherein the video conferencing application obtains first image data and first audio data from the first electronic device and transmits the obtained first image data and first audio data to the connection manager server, and launch a first instance of a collaborative user interface (UI), wherein the first instance of the collaborative UI is presented at a display of the first electronic device in conjunction with the video conferencing application. The processor is further configured to send local constraint information of the first electronic device to the connection manager server, receive from the connection manager server, data associated with a collaborative object, wherein the data associated with the collaborative object comprises at least one of local constraint information of a second electronic device or a first control input received through a second instance of the collaborative UI launched at the second electronic device, and display, through the first instance of the collaborative user interface, a token of the collaborative object. The processor is additionally configured to receive, through the first instance of the collaborative user interface, a second control input for updating the token of the collaborative object displayed at the second instance of the collaborative UI.

In a third embodiment, a non-transitory computer-readable medium, includes instructions, which when executed by a processor, cause a first electronic device to connect to a connection management server communicatively connected to a plurality of electronic devices, execute an instance of a video conferencing application, wherein the video conferencing application obtains first image data and first audio data from the first electronic device and transmits the obtained first image data and first audio data to the connection manager server, and launch a first instance of a collaborative user interface (UI), wherein the first instance of the collaborative UI is presented at a display of the first electronic device in conjunction with the video conferencing application. When executed by the processor, the instructions further cause the first electronic device to send local constraint information of the first electronic device to the connection manager server, receive from the connection manager server, data associated with a collaborative object, wherein the data associated with the collaborative object comprises at least one of local constraint information of a second electronic device or a first control input received through a second instance of the collaborative UI launched at the second electronic device, and display, through the first instance of the collaborative user interface, a token of the collaborative object. When executed by the processor, the instructions further cause the first electronic device to receive, through the first instance of the collaborative user interface, a second control input for updating the token of the collaborative object displayed at the second instance of the collaborative UI.

Other technical features may be readily apparent to one skilled in the art from the following figures, descriptions, and claims.

Before undertaking the DETAILED DESCRIPTION below, it may be advantageous to set forth definitions of certain words and phrases used throughout this patent document. The term "couple" and its derivatives refer to any direct or indirect communication between two or more elements, whether or not those elements are in physical contact with one another. The terms "transmit," "receive," and "communicate," as well as derivatives thereof, encompass both direct and indirect communication. The terms "include" and "comprise," as well as derivatives thereof, mean inclusion without limitation. The term "or" is inclusive, meaning and/or. The phrase "associated with," as well as derivatives thereof, means to include, be included within, interconnect with, contain, be contained within, connect to or with, couple to or with, be communicable with, cooperate with, interleave, juxtapose, be proximate to, be bound to or with, have, have a property of, have a relationship to or with, or the like. The term "controller" means any device, system or part thereof that controls at least one operation. Such a controller may be implemented in hardware or a combination of hardware and software and/or firmware. The functionality associated with any particular controller may be centralized or distributed, whether locally or remotely. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for other certain words and phrases are provided throughout this patent document. Those of ordinary skill in the art should understand that in many if not most instances, such definitions apply to prior as well as future uses of such defined words and phrases.

BRIEF DESCRIPTION OF THE DRAWINGS

For a more complete understanding of this disclosure and its advantages, reference is now made to the following description, taken in conjunction with the accompanying drawings, in which:

FIGS. 4A-4C illustrate aspects of a collaborative user interface according to certain embodiments of this disclosure;

FIGS. 5A-5B illustrate an example of a collaborative user interface extending the functionality of a video conferencing platform to include a gaming function, according to various embodiments of this disclosure; and FIGS. 6 and 7 illustrate examples of operations of performing load balancing and reporting associated with collaborative objects generated through collaborative user interfaces according to various embodiments of this disclosure.

DETAILED DESCRIPTION

FIGS. 1 through 7, discussed below, and the various embodiments used to describe the principles of this disclosure in this patent document are by way of illustration only and should not be construed in any way to limit the scope of the disclosure. Those skilled in the art will understand that the principles of this disclosure may be implemented in any suitably arranged processing platform.

Figure 1:
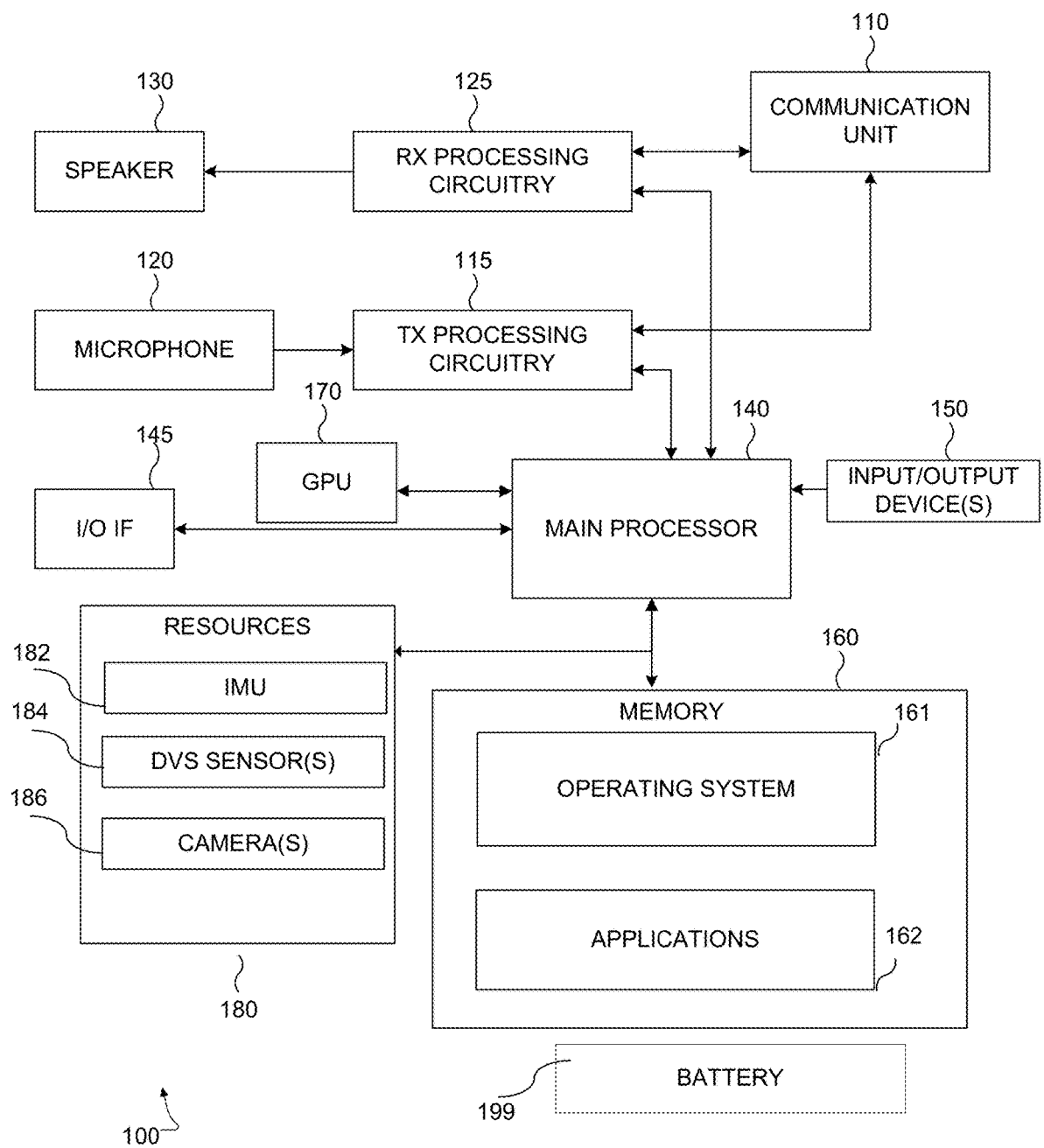
FIG. 1 illustrates a non-limiting example of a device for presenting a collaborative user interface according to some embodiments of this disclosure.

FIG. 1 illustrates a non-limiting example of an electronic device or system 100 for presenting a collaborative user interface according to some embodiments of this disclosure. According to various embodiments of this disclosure, electronic device 100 could be implemented as one or more of a smartphone, a tablet, a laptop computer or other computing system. The embodiment of electronic device 100 illustrated in FIG. 1 is for illustration only, and other configurations are possible. However, suitable devices come in a wide variety of configurations, and FIG. 1 does not limit the scope of this disclosure to any particular implementation of a device.

As shown in the non-limiting example of FIG. 1, the electronic device 100 includes a communication unit 110 that may include, for example, a radio frequency (RF) transceiver, a BLUETOOTH transceiver, or a WI-FI transceiver, etc., transmit (TX) processing circuitry 115, a microphone 120, and receive (RX) processing circuitry 125. The electronic device 100 also includes a speaker 130, a main processor 140, an input/output (I/O) interface (IF) 145, input/output device(s) 150, and a memory 160. The memory 160 includes an operating system (OS) program 161 and one or more applications 162.

Applications 162 can include web browsers, games, social media applications, applications for geotagging photographs and other items of digital content, virtual reality (VR) applications, augmented reality (AR) applications, operating systems, device security (e.g., anti-theft and device tracking) applications or any other applications which provide a network (for example, the Internet) based real-time video communication functionality. Examples of applications providing a network-based real-time video communication functionality include without limitation, chat and video conferencing applications (for example, Zoom®), and gaming applications (for example, multi-player console or PC games). According to some embodiments, the resources of electronic device 100 include, without limitation, speaker 130, microphone 120, input/output devices 150, and additional resources 180.

The communication unit 110 may receive an incoming RF signal, for example, a near field communication signal such as a BLUETOOTH or WI-FI signal. The communication unit 110 can down-convert the incoming RF signal to generate an intermediate frequency (IF) or baseband signal. The IF or baseband signal is sent to the RX processing circuitry 125, which generates a processed baseband signal by filtering, decoding, or digitizing the baseband or IF signal. The RX processing circuitry 125 transmits the processed baseband signal to the speaker 130 (such as for voice data) or to the main processor 140 for further processing (such as for web browsing data, online gameplay data, notification data, or other message data). Additionally, communication unit 110 may contain a network interface, such as a network card, or a network interface implemented through software.

The TX processing circuitry 115 receives analog or digital voice data from the microphone 120 or other outgoing baseband data (such as web data, e-mail, or interactive video game data) from the main processor 140. The TX processing circuitry 115 encodes, multiplexes, or digitizes the outgoing baseband data to generate a processed baseband or IF signal. The communication unit 110 receives the outgoing processed baseband or IF signal from the TX processing circuitry 115 and up-converts the baseband or IF signal to an RF signal for transmission.

The main processor 140 can include one or more processors or other processing devices and execute the OS program 161 stored in the memory 160 in order to control the overall operation of the electronic device 100. For example, the main processor 140 could control the reception of forward channel signals and the transmission of reverse channel signals by the communication unit 110, the RX processing circuitry 125, and the TX processing circuitry 115 in accordance with well-known principles. In some embodiments, the main processor 140 includes at least one microprocessor or microcontroller. According to certain embodiments, main processor 140 is a low-power processor, such as a processor which includes control logic for minimizing consumption of battery 199 or minimizing heat buildup in electronic device 100.

The main processor 140 is also capable of executing other processes and programs resident in the memory 160. The main processor 140 can move data into or out of the memory 160 as required by an executing process. In some embodiments, the main processor 140 is configured to execute the applications 162 based on the OS program 161 or in response to inputs from a user or applications 162. Applications 162 can include applications specifically developed for the platform of electronic device 100, or legacy applications developed for earlier platforms. The main processor 140 is also coupled to the I/O interface 145, which provides the electronic device 100 with the ability to connect to other devices such as laptop computers and handheld computers. The I/O interface 145 is the communication path between these accessories and the main processor 140.

The main processor 140 is also coupled to the input/output device(s) 150. The operator of the electronic device 100 can use the input/output device(s) 150 to enter data into the electronic device 100. Input/output device(s) 150 can include keyboards, touch screens, mouse(s), track balls or other devices capable of acting as a user interface to allow a user to interact with electronic device 100. In some embodiments, input/output device(s) 150 can include a touch panel, an augmented or virtual reality headset, a (digital) pen sensor, a key, or an ultrasonic input device.

Input/output device(s) 150 can include one or more screens, which can be a liquid crystal display, light-emitting diode (LED) display, an optical LED (OLED), an active-matrix OLED (AMOLED), or other screens capable of rendering graphics.

The memory 160 is coupled to the main processor 140. According to certain embodiments, part of the memory 160 includes a random-access memory (RAM), and another part of the memory 160 includes a Flash memory or other read-only memory (ROM). Although FIG. 1 illustrates one example of an electronic device 100. Various changes can be made to FIG. 1.

For example, according to certain embodiments, electronic device 100 can further include a separate graphics processing unit (GPU) 170.

According to certain embodiments, electronic device 100 includes a variety of additional resources 180 which can, if permitted, be accessed by applications 162. According to certain embodiments, additional resources 180 include an accelerometer or inertial measurement unit (IMU) 182, which can detect movements of the electronic device along one or more degrees of freedom. Additional resources 180 include, in some embodiments, one or more dynamic vision sensors 184, and one or more cameras 186 (for example, complementary metal oxide semiconductor (CMOS) sensor type cameras) of electronic device 100. According to various embodiments, DVS sensor(s) 184 comprises a pair of dynamic vision sensors spaced at a stereoscopically appropriate distance for estimating depth at over a field of depth of interest. According to some embodiments DVS sensor(s) 184 comprise a plurality of DVS sensors with overlapping, or partially overlapping fields of view.

According to various embodiments, the above-described components of electronic device 100 are powered by a power source, and in one embodiment, by a battery 199 (for example, a rechargeable lithium-ion battery), whose size, charge capacity and load capacity are, in some embodiments, constrained by the form factor and user demands of the device. As a non-limiting example, in embodiments where electronic device 100 is a smartphone or portable device (for example, a portable terminal used by restaurant waitstaff), battery 199 is configured to fit within the housing of the smartphone and is configured not to support current loads (for example, by running a graphics processing unit at full power for sustained periods) causing heat buildup.

Although FIG. 1 illustrates one example of an electronic device 100 for providing a collaborative user interface, various changes may be made to FIG. 1. For example, the electronic device 100 could include any number of components in any suitable arrangement. As one illustrative example, electronic device 100 could be embedded in a larger system (for example, a seatback entertainment system in a vehicle). In general, devices including computing and systems control platforms come in a wide variety of configurations, and FIG. 1 does not limit the scope of this disclosure to any particular configuration. While FIG. 1 illustrates one operating environment in which various features disclosed in this patent document can be used, these features could be used in any other suitable system.

Figure 2:
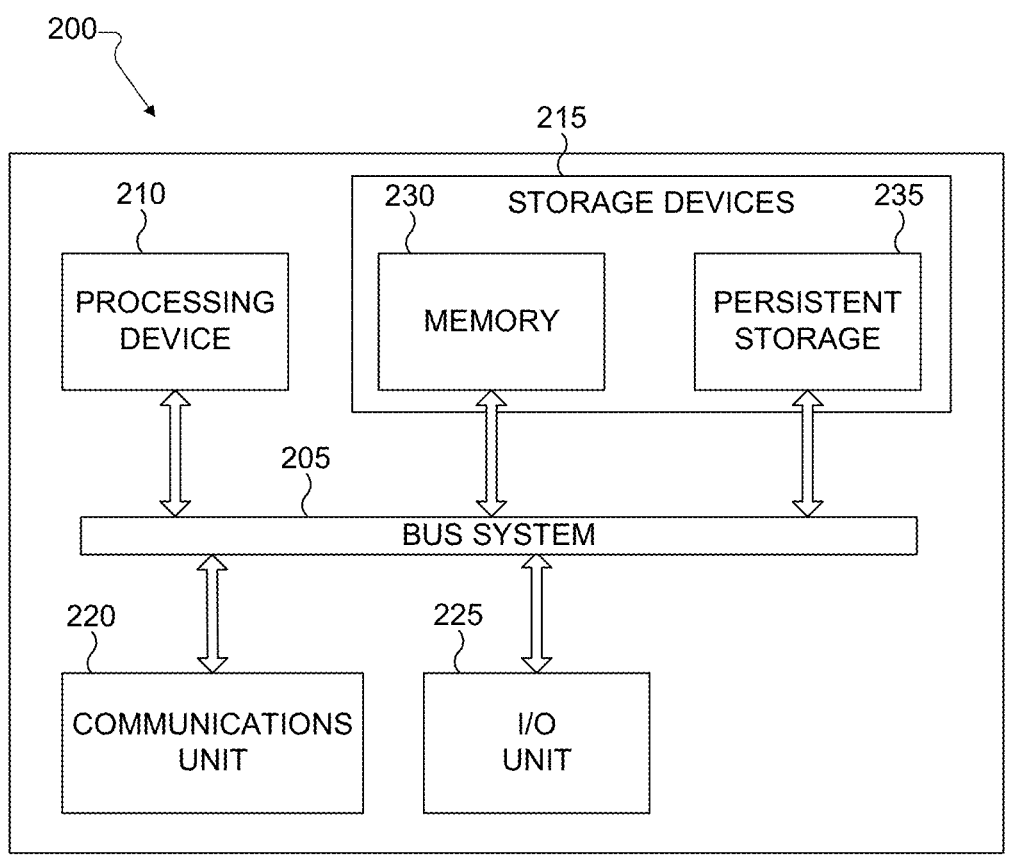
FIG. 2 illustrates an example of a server that can be configured to support a collaborative user interface, according to certain embodiments of this disclosure.

FIG. 2 illustrates an example of a server or computer system 200 that can be configured as a connection manager server to support a collaborative user interface according to certain embodiments of this disclosure. The embodiment of the server 200 shown in FIG. 2 is for illustration only and other embodiments could be used without departing from the scope of the present disclosure. According to certain embodiments, the server 200 operates as a gateway for data passing between a device of a secure internal network (for example, electronic device 100 in FIG. 1), and an unregulated external network, such as the internet.

In the example shown in FIG. 2, the server 200 includes a bus system 205, which supports communication between at least one processing device 210, at least one storage device 215, at least one communications unit 220, and at least one input/output (I/O) unit 225.

The processing device 210 executes instructions that may be loaded into a memory 230. The processing device 210 may include any suitable number(s) and type(s) of processors or other devices in any suitable arrangement. Example types of processing devices 210 include microprocessors, microcontrollers, digital signal processors, field programmable gate arrays, application specific integrated circuits, and discrete circuitry. In certain embodiments, the server 200 can be part of a cloud computing network, and processing device 210 can be an instance of a virtual machine or processing container (for example, a Microsoft Azure Container Instance, or a Google Kubernetes container). Given the scale of the processing operations performed by certain embodiments according to this disclosure, the processing and storage elements of the server 200 may be implemented through cloud computing systems.

The memory 230 and a persistent storage 235 are examples of storage devices 215, which represent any structure(s) capable of storing and facilitating retrieval of information (such as data, program code, and/or other suitable information on a temporary or permanent basis). The memory 230 may represent a random-access memory or any other suitable volatile or non-volatile storage device(s). The persistent storage 235 may contain one or more components or devices supporting longer-term storage of data, such as a ready only memory, hard drive, Flash memory, or optical disc. According to various embodiments, persistent storage 235 is provided through one or more cloud storage systems (for example, Amazon S3 storage).

The communications unit 220 supports communications with other systems or devices. For example, the communications unit 220 could include a network interface card or a wireless transceiver facilitating communications over the network 102. The communications unit 220 may support communications through any suitable physical or wireless communication link(s).

The I/O unit 225 allows for input and output of data. For example, the I/O unit 225 may provide a connection for user input through a keyboard, mouse, keypad, touchscreen, or other suitable input device. The I/O unit 225 may also send output to a display, printer, or other suitable output device.

As noted elsewhere herein, there may variables affecting the quality of a video chat experience which are beyond the control of the platform(s) hosting and presenting the collaborative user interface, and designing and implementing around such exogenous variables is a persistent source of technical challenges in the art.

Figure 3:
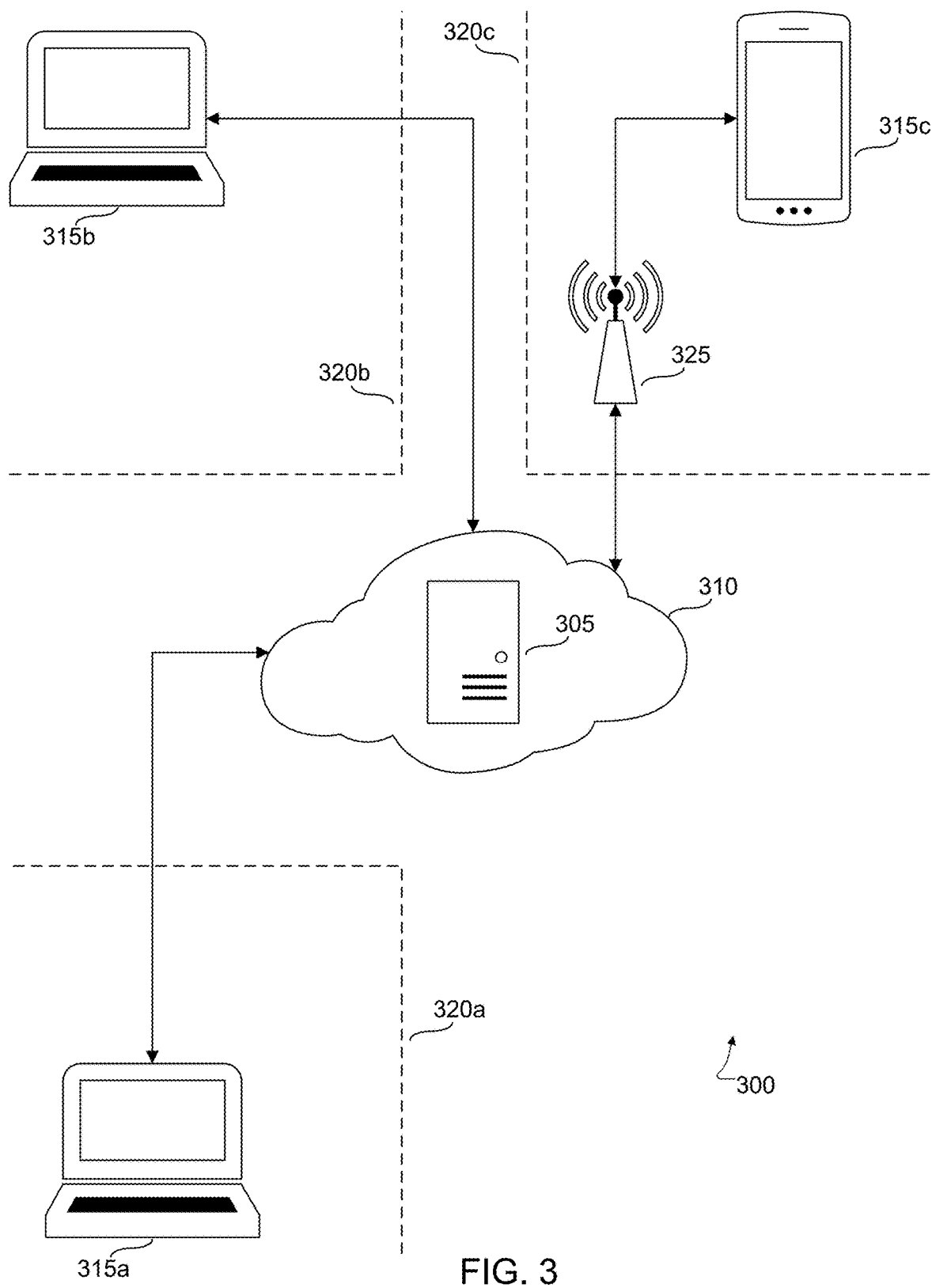
FIG. 3 illustrates a network context associated with presenting a collaborative user interface according to certain embodiments of this disclosure.

FIG. 3 illustrates an example of a network context 300 according to various embodiments of this disclosure, and of the exogenous variables presenting challenges to implementing a collaborative UI supporting extended video conferencing functionalities. Specifically, FIG. 3 illustrates a network architecture for supporting a real-time video conferencing functionality presented via user interfaces on three separate computing platforms.

Referring to the non-limiting example of FIG. 3, network context 300 includes a connection manager server 305 (for example, server 200), which depending on embodiments, may be implemented on a dedicated machine, or as part of a cloud computing network 310. In this example, connection manager server 305 operates as a connection manager for participants to a video conferencing function, wherein users connect individually to connection manager server 305 (for example, by logging into a web conferencing application, such as Zoom®), and connection manager server 305 initiates a conference session between connected users. While not shown in the figure, other connection architectures, such as peer-to-peer connections, or hybrid (i.e., partially through a server, and partially through peer-to-peer connections), are possible and within the scope of this disclosure.

In this example, three client machines—first client machine 315a, second client machine 315b, and third client machine 315c are connected to connection manager server 305, which has established a video conference session between each of client machines 315a-315c. According to certain embodiments, each of client machines 315a-315c presents (for example, on the display of a smartphone or laptop computer) a collaborative user interface for the video conference session. At a minimum, the collaborative user interface supports a functionality wherein each client machine's camera and audio feed are routed through connection manager server 305 and presented through the other participants' displays and speakers.

In this example, there are multiple exogenous variables which cannot be controlled by connection manager server 305 but can significantly affect the ease and extent to which connection manager server 305 can support extended video conferencing functionalities. For example, first client machine 315a may be in a first jurisdiction 320a, which uses a different currency, has different local taxes, and is in a time zone six hours removed from second client machine 315b, which is located in second jurisdiction 320b, where it is nighttime, and the user of second client machine 315b is holding her device in a landscape view, while the user of first client machine 315a is holding his device in portrait view. Further, second client machine 315b has a faster, more secure connection than third client machine 315c in third jurisdiction 320c, who has an unsecure connection through a public access point 325.

Skilled artisans will appreciate that, when the functionality of a video conference application becomes dependent on factors which are "out of the box" and tied to constraints local to the equipment or jurisdiction at which a user interface of a video conference established by connection manager server 305, technical challenges will arise.

Figure 4A:
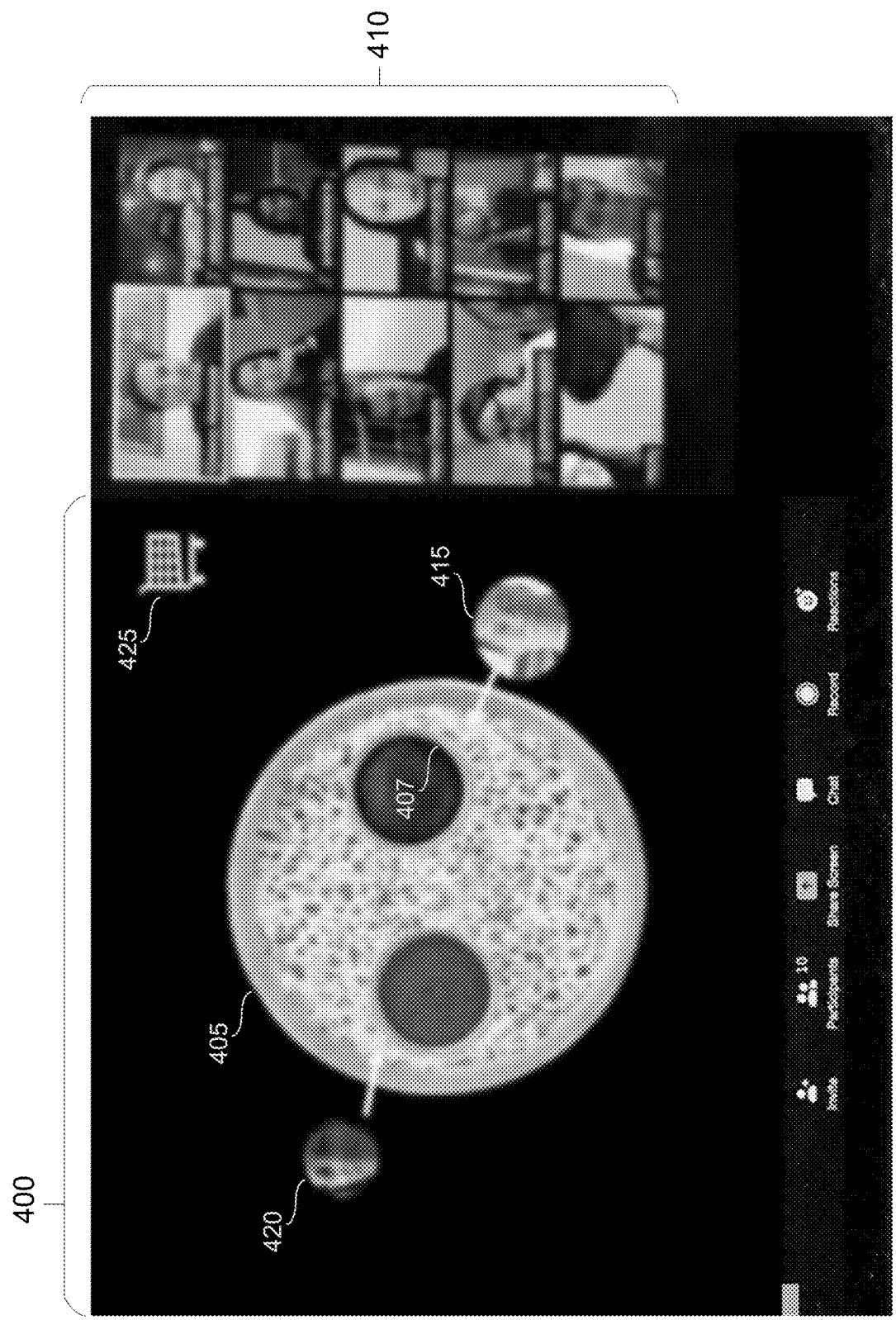
Figure 4B:
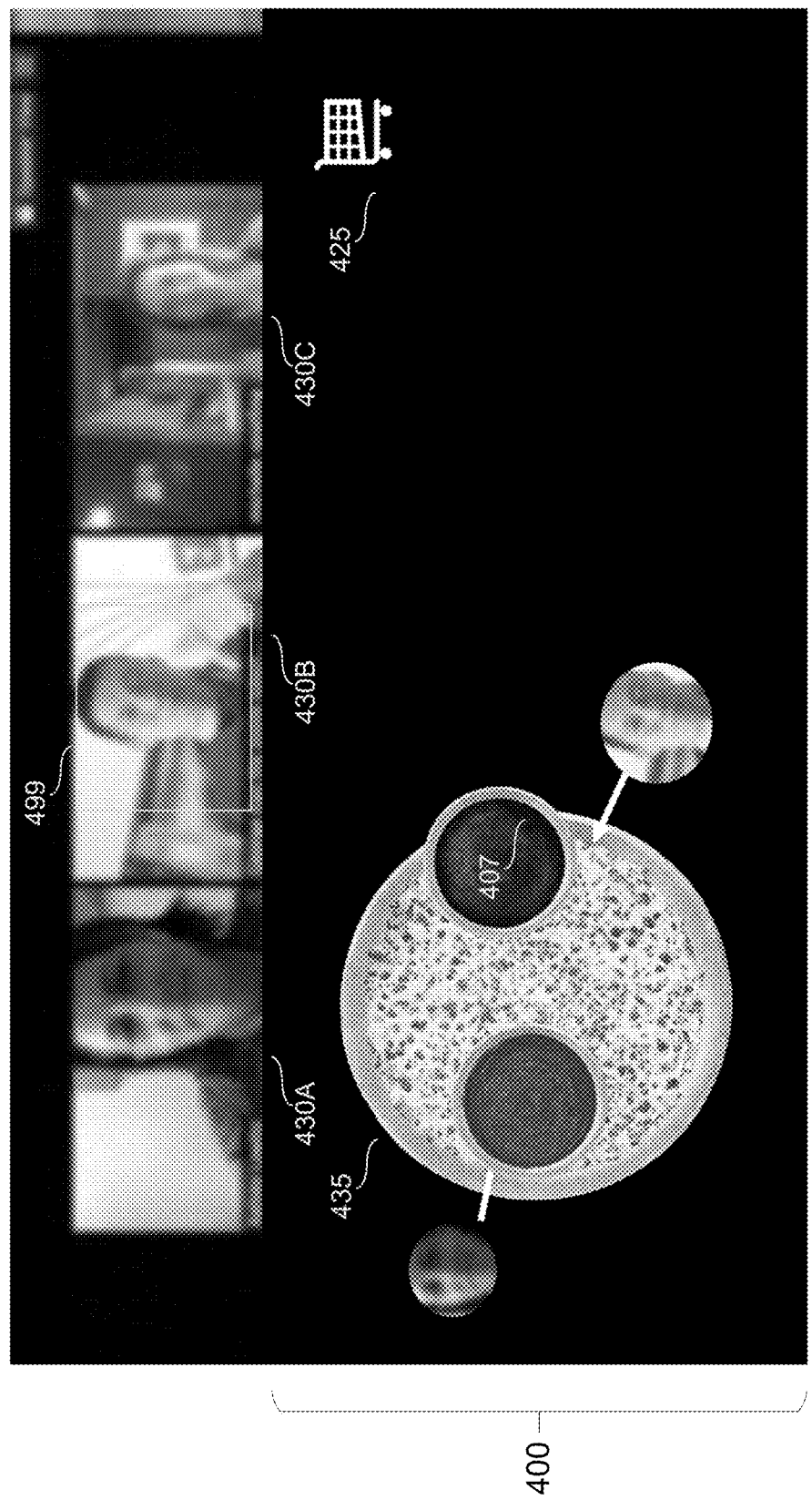

FIGS. 4A-4C illustrate aspects of a collaborative user interface for generating a collaborative object according to various embodiments of this disclosure. For convenience of cross-reference, elements common to more than one of FIGS. 4A-4C are numbered similarly.

Referring to the non-limiting example of FIG. 4A, an instance of a collaborative user interface 400 for generating a collaborative object as presented at a first electronic device is shown in the figure. As used in this disclosure, the expression "collaborative object" refers to an item of digital content that is created at least in part through the collaborative user interface, or a physical item or process whose parameters are defined through user inputs provided through a collaborative user interface. In the explanatory examples of FIGS. 4A and 4B, the collaborative object is a food order, which and is represented in the user interface through graphical representations, or tokens, such as the pizza represented by token 405. As used in this disclosure, the expression "token" encompasses one or pieces of digital content presented through the collaborative user interface which specifies an attribute of a collaborative object under joint development through the collaborative user interface. According to some embodiments, the attributes may be specified textually. According to various embodiments, the attributes of the collaborative object are specified visually, through image tags (for example, image tag 407 in FIG. 4B) However, other embodiments involving different collaborative objects, such as a video editing or CAD drawing of a product under development, are possible and within the contemplated scope of this disclosure.

In the example of FIG. 4A. a video conference provided through an application of a central video host (for example, ZOOM® or MICROSOFT TEAMS®) has been initiated with ten participants, whose individual camera feeds are shown in video tiles 410 at the right side of the screen. Depending on embodiments, collaborative user interface 400 may be presented through one or more of the native view settings (for example, document share, or "breakout" rooms) of the video conferencing platform. For example, in the non-limiting example of FIG. 4A, collaborative user interface 400 occupies a portion of the screen the video conferencing platform uses for displaying a shared item of content. In this way, certain embodiments according to this disclosure both utilize native display functionalities of the video conferencing platform, and, at the same time, extend the functionality of the video conferencing platform. As used in this disclosure, the expression "video conferencing platform" encompasses the combination of instances of a local client application (for example, an instance of ZOOM® or MICROSOFT TEAMS® application or any other video conferencing applications) running on the participants' devices and the backend server or cloud processing platform connecting the participants.

In this example, each of the ten participants can contribute to defining a collaborative object (for example, a food order for the office), through collaborative user interface 400. For example, first user 415 and second user 420 have provided user inputs specifying the toppings they wish to incorporate on the pizza shown as token 405, which is a component of a collaborative object (in this case, a food order for the office). As shown in the figure, collaborative user interface 400 is updated in response to individual inputs so that each participant's user input is shown on a common view which is visible to all ten participants. In this way, collaborative user interface 400 provides a mechanism by which all of the participants can participate in the development of the collaborative object.

As shown in the explanatory example of FIG. 4A, when the participants have completed their work on the collaborative object, they can conclude the process by pushing "cart" button 425. Depending on embodiments, the collaborative process may end when a single user hits "cart" button 425. In some embodiments, the process of developing a collaborative object ends when a majority or plurality of participants hit "cart" button 425. In certain embodiments, the process of developing and defining a collaborative object concludes when a particular participant (for example, an office manager) hits "cart" button 425. In this way, the operation of collaborative user interface can be configured to align with the collaborative process among the participants.

FIG. 4B illustrates a second view of example collaborative user interface 400.

As previously noted, collaborative user interfaces according to various embodiments of this disclosure may operate within the native views of a video conferencing platform, and also extend the functionality of the video conferencing platform. Whereas, in the example of FIG. 4A, collaborative user interface 400 was provided through the video conferencing platform's window for sharing content, in the non-limiting example of FIG. 4B, collaborative user interface is provided through the "breakout room" functionality of the video conferencing platform.

As shown in FIG. 4B, a subset of three users (users 430A-430C) are collaborating separately on a component 435 of a collaborative object. Here, as in the illustrative example of FIG. 4A, the collaborative object is a food order for the ten (10) participants on the video conferencing. While modern video conferencing platforms' ability to connect tens, hundreds, and even thousands of participants has been an important factor in the widespread adoption of certain platforms, this functionality can, at times be a distraction or hinderance to collaboration. Put differently, there can be, both figuratively and literally, too many cooks in the kitchen.

The non-limiting example of FIG. 4B illustrates how collaborative user interfaces according to certain embodiments of this disclosure can leverage native views of a video conferencing platform for focused collaboration on developing and generating a collaborative object. In this example, users 430A-430C are able to provide user inputs, which provide the basis for updates to commonly viewed collaborative user interface 400. Thus, when second user 430B moves his topping selection to the pizza represented through token 405, each of users 430A-430C see user 430B's inputs on a shared view provided by collaborative user interface 400.

FIG. 4C illustrates operations of an example method 450 for providing a collaborative user interface (for example, collaborative user interface 400 in FIGS. 4A-4B) according to various embodiments of this disclosure.

Referring to the non-limiting example of FIG. 4C, at operation 455, a web-based video conference is initiated. In embodiments wherein the web-based video conference is provided across a hub-spoke architecture (i.e., through a central provider, such as ZOOM®), the web-based video conference is initiated by client applications at the participants' electronic devices (for example, electronic device 100 in FIG. 1) logging into a platform provided at a central processing platform (for example, a server, such as server 200 in FIG. 2, or a cloud-based processing platform), and the central processing platform mediating the exchange of voice and video data between the participants.

At operation 460, instances of a collaborative user interface (for example, collaborative user interface 400 in FIGS. 4A-4B) are launched. According to some embodiments, launching instances of collaborative user interface 400 comprises, launching a micro-application (or "app-within-an-app") associated with the collaborative user interface at each of the participants' electronic devices. In some embodiments, launching instances of the collaborative user interface pushing a micro-application associated with the collaborative user interface (for example, a JAVA™ Applet) from the central hosting platform for the video conference to each of the participants' electronic devices.

According to certain embodiments, at operation 465, local constraint information is obtained, by the central processing platform providing the video conference, from at least the participants' devices. As discussed elsewhere herein, the technical challenges associated with extending the functionality of video conferencing beyond real-time exchange of video and voice data at scale include, without limitation, managing the effects of localized factors specific to individual participants. As used in this disclosure, the expression, "local constraint information" encompasses both rules specifying local constraints specific to a geographic location (for example, a rule of the form "users in location 'X' which is in State "Y" cannot order alcohol online") as well as data specifying, or a proxy for the value of a parameter for a rule (for example, an IP address of a client machine associated with location "X," where individuals cannot purchase alcohol online). According to some embodiments, local constraint information may be obtained from both the participants' devices (for example, IP addresses and local times), data stores maintained by the video conferencing platform (for example, registered user profiles maintained at the video conferencing platform), and third-party sources (for example, data and rules provided by an application or service associated with the collaborative object). In FIGS. 4A-4B, where the collaborative object is a food order, local constraint information from a third party may include rules (for example, delivery estimates, ordering windows, etc.) of a restaurant fulfilling the food order.

According to various embodiments, at operation 470, the parameters of each instance of the collaborative user interface are set, at least based in part on the local constraint information. Returning to the continuing example of FIGS. 4A-4B, where the collaborative object is a food order, setting the parameters of the collaborative user interface comprises, without limitation, removing, at one or more instances of the collaborative user interface, user input options that are prohibited by local constraints (for example, toppings which are not available at the local branch of the restaurant fulfilling part of an order).

In certain embodiments, at operation 475, the participants in the video conference provide control inputs through instances of the collaborative user interface. Depending on embodiments, the control inputs may be provided through a pointing tool (for example, a mouse or trackpad) of the electronic device displaying the video conference. In some embodiments, the control inputs may be provided verbally, through microphones of the participants' electronic devices. In certain embodiments, the control inputs are provided as user gestures which are recorded by the cameras of the participants' electronic devices and analyzed (for example, using machine-learning (ML) object recognition software) locally or at the central processing platform to obtain control inputs from the camera data. For example, the analysis of the image data may comprise assigning a classification (for example, "upward hand swipe") associated with the image data.

As shown in FIG. 4C, at operation 480, the instances of the collaborative user interface are updated in response to the control inputs received at operation 475. As used in this disclosure, the expression "updating a collaborative user interface" encompasses changing the appearance of a portion of the collaborative user interface (either by all of the participants, as in FIG. 4A, or a subset of participants, as in FIG. 4B) in response to an individual user's control input. For example, in the example of FIG. 4A, when user 415 moves the image tag 407 representing his topping choice onto the pizza represented by token 405, collaborative user interface 400 is updated such that all of the participants represented in video tile 410 see an updated user interface in which image tag 407 is moved onto the pizza represented by token 405.

According to various embodiments, at operation 485, a collaborative object is generated based on the received control inputs and local constraints. According to various embodiments, the collaborative object generated at operation 485 is saved, or used as a further control input (for example, the food order described in FIGS. 4A and 4B) for another system. In embodiments where the collaborative object is a drawing or design file, the collaborative object may be converted (for example to a G-code) to be used as control inputs for a 3-D printer or CNC milling machine.

Figure 5A:

FIGS. 5A and 5B illustrate aspects of how a collaborative user interface according to various embodiments of this disclosure can extend the functionality of a video conferencing platform to support collaborative gaming.

Referring to the illustrative example of FIG. 5A, a video conference between twenty-five (25) participants shown in video tiles (for example, video tile 505) is shown in the figure. As shown in the figure, the video conference is presented through a native view of the video conferencing platform, in which all of the participants are represented on screen through video tiles of the camera feeds from their devices.

In this explanatory example, the elements of a collaborative user interface are presented as overlays (including the token comprising pizza graphic 510 and timer 515) to the native view of the video conference to provide an in-conference game. In the example game of FIG. 5A, the participants shown by the video tiles try to "swat" pizza graphic 510 out of their video tile to avoid having pizza graphic 510 in their tile when timer 515 runs out. Thus, in this example, pizza graphic 510 is a digital object which moves across the screen in response to users' inputs (for example, gestures recorded by their devices and analyzed to recognize movements). In some embodiments, the participant over whose video tile pizza graphic 510 appears when timer 515 expires may have their game score adjusted. In some embodiments, the participant upon whose video tile pizza graphic 510 stops may be responsible for the costs of the food order. Numerous variations are possible, and within the contemplated scope of this disclosure. As shown in FIG. 5A, the elements of the collaborative user interface (timer 515 and pizza graphic 510) are provided as an overlay to the native view of the video conferencing platform.

FIG. 5B illustrates operations of an example method 550 for extending the functionality of a video conferencing platform to provide in-conference gaming (for example, as described with reference to FIG. 5A) by means of a collaborative user interface, according to various embodiments of this disclosure.

Referring to the non-limiting example of FIG. 5B, at operation 555, a web-based video conference is initiated. According to various embodiments, the video conference is initiated as described with reference to operation 455 in FIG. 4C of this disclosure, with the participants individually connecting with a central hub of the video conferencing platform, and the central hub mediating the exchange and publication of voice and camera data between the participants to the video conference.

According to certain embodiments, at operation 560, instances of the collaborative user interface are launched at each participant's machine. In some embodiments, the collaborative user interface is provided in a specifically reserved space of a native view of the video conferencing platform, such as a space for sharing digital content or a breakout room. In some embodiments, the collaborative user interface is provided as one or more overlays (for example, pizza graphic 510 and timer 515 in FIG. 5A) to a native view of the video conferencing platform.

In certain embodiments, the native functionality of a video conferencing platform permits users to personalize or restructure the view at their devices. For example, in some cases, the native functionality of a video conferencing platform may permit a first user to configure their view such that only the camera feed of an active speaker is shown on screen, while a second user may be able to view a plurality of video tiles at once. Depending on the operation of the game functionality, it may be necessary, or at least, advantageous to have the camera feeds of the participants in the game presented according to a common layout with respect to each other. For example, in the "pizza pong" game shown in FIG. 5A, user inputs may be able to affect the direction in which pizza graphic moves over the native view of the video conferencing application. Where different users have different native views, the physics of the game (i.e., hitting the pizza in one direction should make it move towards the same user) may undermined. Accordingly, in certain embodiments, at operation 565, the video conference view is normalized, or standardized to provide a normalized view. According to various embodiments, the elements of the collaborative user interface (for example, pizza graphic 510) appear over the same content in each user's instance of the normalized view. In some embodiments, normalization may be performed at the server level, by analyzing camera data and returning scaling parameters to the collaborative user interface. In various embodiments, the normalization of operation 565 may be performed locally at the electronic device providing the collaborative user interface. For example, in some embodiments, object recognition of the image data may be performed to recognize a core set of predefined user features (for example, a user's eyes, mouth and at least one limb), and a view of the user in the collaborative user interface is rescaled to a common size corresponding to an interaction window.

According to various embodiments, at operation 570, for each participant, the camera data from the user's device is analyzed and an interaction window for the user is defined within the field of view of the camera. As used in the context of this disclosure, the expression "interaction window" refers to a subset of the field of view of a camera or coordinate range within an image tile where image data associated with user gestures may be analyzed and registered as user inputs. As discussed elsewhere in this disclosure, the technical challenges associated with implementing a collaborative user interface include, without limitation, managing the effects of local variables outside the control of the video conferencing platform, and conserving processing resources. In some embodiments, for example, where one participant to a video conference has a digitally generated background which interacts badly with the camera feed (for example, by flickering in and out, or "chopping off" objects in the view area of the camera), the interaction window for that participant may be reduced to mitigate the effects of the digital background. As another example, where a central processing platform is tasked with analyzing and recognizing gestures from multiple video participants, each participant's interaction window (for example, interaction window 499) may be reduced in order to reduce the volume of camera data to be analyzed.

As shown in the illustrative example of FIG. 5B, at operation 575, the collaborative user interface receives camera data within one or more participant's interaction window, and analyzes the data (for example, by performing object recognition) to identify movements or gestures within the camera data. According to various embodiments, to conserve processing bandwidth at a central processing platform, the analysis and gesture recognition components of operation 575 may be performed locally wherever possible, with the central processing platform only performing gesture recognition from user devices (for example, e-readers, and other devices configured to maximize battery life, even at the expense of speed) which cannot recognize user inputs within camera data.

In certain embodiments, at operation 580, the elements of the collaborative user interface are updated in response to the received user inputs, and an updated version of a commonly visible user interface is provided to the participants of the video conference. For example, when the user in video tile 520 in FIG. 5A successfully swats pizza graphic 510 leftwards, the collaborative user interface is updated to show pizza graphic 510 moving in response to the user's input.

FIG. 6 illustrates operations of an example method 600 for managing load balancing and refining a collaborative user interface according to various embodiments of this disclosure.

As discussed elsewhere herein, the technical and practical benefits of modern video conferencing platforms (for example, ZOOM® or WEBEX®) include the ability to host and connect participants at scale, with tens, hundreds, and in some cases, thousands of participants to a single video conference. Providing collaborative user interfaces, and in particular, generating certain collaborative objects at equivalent scale can unique technical challenges, in particular, unexpected or "viral" loads on resources controlled or specified by the collaborative object.

For example, returning to the case where the collaborative object is a food order or other physical collaborative object whose demands on local resources for providing the collaborative object scales linearly with the number of participants interacting with the collaborative user interface, while the video conferencing platform through which the collaborative user interface can readily increase the numbers of participating users, the restaurants, drivers and other resources needed to implement the instructions specified through the collaborative object may not be available at the same scale. Here, again, local constraints and local factors beyond the control of a video conferencing platform can frustrate the implementation of a collaborative user interface as a tool for generating collaborative objects. As used in this disclosure, the expression "physical collaborative object" encompasses an object or set of actions in the real, physical world whose parameters are collaboratively generated through the inputs of multiple users across a collaborative user interface according to certain embodiments of this disclosure.

Referring to the illustrative example of FIG. 6, at operation 605, a computing platform (for example, the central computing platform of the video conferencing platform, or a computing platform of a third party associated with implementing aspects of the collaborative object) obtains a current collaborative object. According to some embodiments, the collaborative object is generated at the end of the video conference and submitted (for example, by one or more users hitting the "cart" button 425 in FIG. 4A). In some embodiments, for example, where the risk of a collaborative object presenting a "viral" or out-of-range load on third-party resources associated with the collaborative object, method 600 may be performed on a rolling or periodic basis, with the collaborative user interface updated as necessary to provide warnings of unsolvable load problems.

According to certain embodiments, at operation 610, the computing platform which obtained the current collaborative object at operation 605, performs a load balancing analysis of the current collaborative object. In some embodiments, the load balancing analysis comprises an analysis of whether the resources (including both physical and computational resources) to implement the collaborative object as exactly specified are available. In some embodiments, the current collaborative object is generalized to within a predefined tolerance, and the load balancing analysis is performed on the generalized collaborative object. Returning to the familiar example of a collaborative object comprising a food order for 23 pizzas, of which 14 are "everything" pizzas, and nine have no toppings. Instead of analyzing whether the local provider has the resources to produce 14 "everything" pizzas, the load balancing analysis may only consider whether the available resources (for example, local branches of a pizza restaurant) exist to make and deliver 23 pizzas. In this way, the amount of data which needs to be exchanged between local resources and the computing platform performing the load balancing analysis is reduced, and the load balancing analysis does not prevent the creation of a collaborative object, even if the exact parameters of the current collaborative object cannot be achieved. Put more simply, the participants of a video conference to assemble a lunch order would prefer that some lunch order go through, rather than the process be canceled because only thirteen "everything" pizzas can be provided, rather than the originally specified fourteen.

In some embodiments, performing the load balancing analysis of the current collaborative object at operation 610 is based on real-time collected from the resources (for example, a restaurant and a delivery service for fulfilling a collaborative object-based food order). In some embodiments, such as where relevant data is abundant, but not necessarily available in real time (for example, data from restaurants, which carefully monitor their orders and consumption of ingredients and supplies but may not be able to provide up-to-the-moment data on the supplies and ingredients on hand), the load balancing analysis performed at operation 610 may comprise a forecast generated based the collected historical data. In certain embodiments, the computing platform(s) performing operation 610 may implement one or more computer-based models (for example, an artificial intelligence (AI) or regression-based model) to perform a predictive analysis of the load associated with a current collaborative object. Returning to the case of a current collaborative object specifying an order for 23 pizzas, instead of polling local resources to see if the resources for completing the order exist, the computing platform may, at operation 610 look to a modeled forecast of the expected demand for pizza for that day and time at a local resource and base its load analysis on the predicted demand for pizza provided by the model trained on historical data.

At operation 615, the computing platform determines whether local constraints provide a solution for implementing the current collaborative object. According to some embodiments, operation 615 is performed by applying current local constraint data (for example, data regarding available bandwidth and resources) within a hierarchy of predefined solutions. For example, in the case where the current collaborative object is a large food order to be fulfilled and delivered to one or more locations, operation 615 may comprise, for a given delivery location, determining, as a first possibility in a hierarchy of solutions, if a first restaurant location and set of delivery resources (for example, drivers employed by the first location) can handle the workload associated with its portion of the collaborative object. If the first restaurant location within the hierarchy of solutions, the computing platform may determine whether the first restaurant location, in conjunction with a second restaurant location, can handle the workload associated with preparing and delivering a portion of the collaborative object.

According to some embodiments, the hierarchy of solutions may be predefined, and may comprise both layers and branches. For example, the hierarchy of solutions may comprise solutions for different scenarios in which local constraints introduce different bottlenecks to handling the load associated with the collaborative object. As one example, the hierarchy of solutions may comprise a hierarchy of solutions for addressing the issue of there not being enough drivers to complete an order, as well as a hierarchy of solutions for bottlenecks in the production of the foods in the order.

As with operation 610, operation 615 may be performed, in whole or in part, based on predictions regarding the local constraints at a given time. For example, while the computing platform performing operation 615 may not be able to obtain real-time data as to, for example, how many drivers at a particular restaurant location are available to deliver an order created as a collaborative object from a collaborative user interface, it may be able to provide current values to features of a pretrained model, from which a determination of whether a load balancing solution can be found. Instead of obtaining data from a restaurant as to their drivers are presently available, the computing platform may instead provide current values of features (for example, current time of day or the presence of a high-demand event) to a model trained on historical driver availability data. For example, where the present date and time is known to align with a high-demand event (for example, a major televised football game), the dip in driver availability can likely be accurately predicted.

As shown in the illustrative example of FIG. 6, where a load balancing solution can be found at operation 615, method 600 proceeds to operation 620, wherein the computing platform which performed operations 610 and 615 generates a report on the load balancing solution. According to various embodiments, the report generated at operation 620 identifies the differences between the specified parameters of the collaborative object as specified by the users of the collaborative user interface relative to the load balancing solution generated at operation 615. To illustrate, in the example of a collaborative object comprising an order for fourteen "everything" pizzas and nine cheese pizzas, the report generated at operation 620, may indicate that the load balanced solution to local constraints on the originally formulated order provided that thirteen "everything" pizzas, nine cheese pizzas, and one sausage pizza were actually delivered. Further, depending on embodiments, the report generated at operation 615 may further report on the effect on all of the local constraints on the collaborative object. Thus, in some embodiments, the report generated at operation 620 may be a global, multi jurisdictional receipt, indicating, for a multi-location order, the local added taxes and solutions to load balancing issues.

As shown in the explanatory example of FIG. 6, if at operation 615, a load balancing solution to the known local constraints cannot be found, method 600 proceeds to operation 625, wherein the collaborative user interface is updated to reflect the fact that local constraints preclude the generation of the collaborative object. In some embodiments, updating the collaborative interface comprises presenting an error message visible to all of the video conference participants. In certain embodiments, updating the collaborative interface comprises changing or restricting the user inputs available to the video participants to exclude options for which no load balancing solution exists (for example, specifying a delivery time within the next 20 minutes on Super Bowl Sunday).

While method 600 has been described with reference to an example in which a collaborative object is developed through a collaborative user interface provided through a video conferencing application, embodiments in which a collaborative object presenting viral, or rapidly scaling loads is developed on other platforms are within the contemplated scope of this disclosure. Beyond video conferencing platforms, examples of other application or communication platforms where a collaborative user interface from which collaborative objects (including, but not limited to, mass food or service delivery orders) may be implemented include, without limitation, business messaging platforms (for example, SLACK) and social content streaming platforms (for example, TWITCH), which bring together users at scale and have in-app communication functionalities to catalyze surges of activity among users.

FIG. 7 illustrates operations of an example method 700 for generating, creating, using, and/or modifying collaborative objects at a first electronic device (for example, first electronic device 100 in FIG. 1) according to various embodiments of this disclosure. In this illustrative example, the first electronic device is communicatively connected to a connection manager server, which is, in turn, connected to a second electronic device.

Referring to the non-limiting example of FIG. 7, at operation 705, the first electronic device executes an instance of a video conferencing application, wherein the video conferencing application obtains first image data and first audio data from the first electronic device (for example, through the camera and microphone(s) of a smartphone operating as the first electronic device), and provides one or more video or audio feeds from additional electronic devices communicatively connected to the first electronic device through the connection manager server, or another server operating as a connection hub for the video conferencing application.

At operation 710, the first electronic device launches a first instance of a collaborative user interface, wherein the first instance of the collaborative user interface is displayed in conjunction with the video conferencing application. Examples of the first instance of the collaborative user interface as presented in conjunction with the video conferencing application include, without limitation, collaborative user interface 400 in FIG. 4A.

According to various embodiments, at operation 715, the electronic device sends information regarding local constraints to the connection manager server. As used in this disclosure, the expression "local constraint information" encompasses information specific to the first electronic device or the location in which the first electronic device is operating in which affects one or more aspects of the collaborative object or presenting tokens through the collaborative user interface. Examples of local constraint information include, without limitation, the network bandwidth at the first electronic device (for example, whether the first electronic device is connected to a network through a fast or slow connection), one or more location specific rules associated with provision of the collaborative object (for example, where the collaborative object is a food and drink order, rules prohibiting the inclusion of alcohol in the jurisdiction where the first electronic device is located), or a forecasted load on one or more resources for provisioning the collaborative object (for example, where the collaborative object is an order, and the order exceeds the inventory available near the first electronic device).

As shown in the explanatory example of FIG. 7, at operation 720, the first electronic device receives data associated with the collaborative object, wherein the received data comprises one or more of local constrain information of a second electronic device or a control input received through an instance of the collaborative user interface, wherein the second instance of the collaborative UI is launched at the second electronic device. In other words, a user at the first electronic device and a user at the second electronic device are both providing inputs and collaborating (through the video conferencing application) to develop the parameters of a collaborative object. With the data received at operation 720, the user at the first electronic device's information regarding the collaborative object is synchronized with the information regarding the collaborative object presented at the second electronic device.

According to some embodiments, at operation 725, the collaborative user interface displays a token (for example, token 405 in FIG. 4A) associated with one or more current attributes (for example, the person currently liable for paying for a collaborative object comprising a food order) of the collaborative object.

As shown in FIG. 7, at operation 730, a second control input for updating the token is received through the instance of the collaborative user interface presented at the first electronic device. According to various embodiments, the instance of the token at the first electronic device is updated in response to the second control input, and data associated with the input is generated and pushed out to the connection manager server to propagate similar updates at other instances of the collaborative user interface.

The embodiments described with reference to FIGS. 1-7 are intended to illustrate, rather than limit the scope of this disclosure, and skilled artisans will appreciate that further embodiments and variations of the structures and principles set forth herein are possible and within the contemplated scope of this disclosure.

What is claimed is:

1. A method for using collaborative objects across a plurality of networked devices, the method comprising:
　　at a first electronic device of a plurality of electronic devices connected to a connection manager server, executing an instance of a video conferencing application, wherein the video conferencing application obtains first image data and first audio data from the first electronic device and transmits the obtained first image data and first audio data to the connection manager server;
　　launching, at the first electronic device, a first instance of a collaborative user interface (UI), wherein the first instance of the collaborative UI is presented at a display of the first electronic device in conjunction with the video conferencing application;
　　sending local constraint information of the first electronic device to the connection manager server, wherein the local constraint information of the first electronic device comprises a constraint on a collaborative object specific to a geographic location of the first electronic device;

receiving, from the connection manager server, data associated with the collaborative object, wherein the data associated with the collaborative object comprises local constraint information of a second electronic device and a first control input received through a second instance of the collaborative UI launched at the second electronic device, wherein the local constraint information of the second electronic device comprises a constraint on the collaborative object specific to a geographic location of the second electronic device;

modifying at least one parameter of the first instance of the collaborative UI and the second instance of the collaborative UI by removing one or more user input options from the first instance of the collaborative UI and the second instance of the collaborative UI based on the local constraint information of the first electronic device and the local constraint information of the second electronic device, wherein the local constraint information of the first electronic device comprises one or more location specific rules associated with a provision of the collaborative object among the collaborators, or a forecasted load on one or more resources for provisioning the collaborative object among the collaborators;

displaying, through the first instance of the collaborative user interface, a token of the collaborative object; and receiving, through the first instance of the collaborative user interface, a second control input for updating the token of the collaborative object displayed at the second instance of the collaborative UI.

2. The method of claim 1, wherein the local constraint information of the first electronic device comprises one or more of the geographic location of the first electronic device, or information as to network bandwidth at the first electronic device.

3. The method of claim 1, further comprising:
analyzing, by the first electronic device, the obtained first image data to identify coordinate values of one or more predefined user features within the first image data;
defining an interaction window within the obtained first image data based on the identified coordinate values of the one or more predefined user features;
normalizing a view of the first image data in the first instance of the collaborative UI based on the identified coordinate values of the one or more predefined user features; and
transmitting the normalized view of the first image data to the connection management server for normalizing the view of the first image data in the second instance of the collaborative UI.

4. The method of claim 3, further comprising:
obtaining, at the first electronic device, second image data, wherein the second image data captures a movement of a user within the interaction window;
analyzing the second image data to obtain a classification of the movement of the user within the interaction window, wherein the classification is associated with a user input; and
transmitting the user input to the connection manager server for updating the token of the collaborative object to be displayed in the first and second instances of the collaborative user interface.

5. The method of claim 1, wherein the token comprises a graphical representation of a physical collaborative object, and wherein the graphical representation comprises one or more tags of content comprising image data obtained at the first electronic device.

6. The method of claim 1, further comprising:
receiving, from the connection management server, data for updating the token of the collaborative object, wherein the data for updating the token of the collaborative object is based on the second control input, as modified in response to the local constraint information of the first electronic device.

7. The method of claim 6,
wherein the second control input and the local constraint information of the first electronic device do not permit a load balancing solution for provisioning the collaborative object, and
wherein the second control input is modified to satisfy the load balancing solution for provisioning the collaborative object.

8. A first electronic device, comprising:
an audio sensor;
an image sensor; and
a processor configured to:
connect to a connection management server communicatively connected to a plurality of electronic devices,
execute an instance of a video conferencing application, wherein the video conferencing application obtains first image data and first audio data from the first electronic device and transmits the obtained first image data and first audio data to the connection manager server,
launch a first instance of a collaborative user interface (UI), wherein the first instance of the collaborative UI is presented at a display of the first electronic device in conjunction with the video conferencing application,
send local constraint information of the first electronic device to the connection manager server, wherein the local constraint information of the first electronic device comprises a constraint on a collaborative object specific to a geographic location of the first electronic device,
receive from the connection manager server, data associated with the collaborative object, wherein the data associated with the collaborative object comprises local constraint information of a second electronic device and a first control input received through a second instance of the collaborative UI launched at the second electronic device, wherein the local constraint information of the second electronic device comprises a constraint on the collaborative object specific to a geographic location of the second electronic device,
modify at least one parameter of the first instance of the collaborative UI and the second instance of the collaborative UI by removing one or more user input options from the first instance of the collaborative UI and the second instance of the collaborative UI based on the local constraint information of the first electronic device and the local constraint information of the second electronic device, wherein the local constraint information of the first electronic device comprises one or more location specific rules associated with a provision of the collaborative object among the collaborators, or a forecasted load on one or more resources for provisioning the collaborative object among the collaborators, display, through the first instance of the collaborative user interface, a token of the collaborative object, and receive, through the first instance of the collaborative user interface, a second control input for updating the token of the collaborative object displayed at the second instance of the collaborative UI.

9. The first electronic device of claim 8, wherein the local constraint information of the first electronic device comprises one or more of the geographic location of the first electronic device, or information as to network bandwidth at the first electronic device.

10. The first electronic device of claim 8, wherein the processor is further configured to:
analyze the obtained first image data to identify coordinate values of one or more predefined user features within the obtained first image data,
define an interaction window within the obtained first image data based on the identified coordinate values of the one or more predefined user features,
normalize a view of the obtained first image data in the first instance of the collaborative UI based on the identified coordinate values of the one or more predefined user features, and
transmit the normalized view of the obtained first image data to the connection management server for normalizing the view of the obtained first image data in the second instance of the collaborative UI.

11. The first electronic device of claim 10, wherein the processor is further configured to:
obtain second image data, wherein the second image data captures a movement of a user within the interaction window,
analyze the second image data to obtain a classification of the movement of the user within the interaction window, wherein the classification is associated with a user input, and
transmit the user input to the connection manager server for updating the token of the collaborative object to be displayed in the first and second instances of the collaborative user interface.

12. The first electronic device of claim 8, wherein the token comprises a graphical representation of a physical collaborative object, and
wherein the graphical representation comprises one or more tags of content comprising image data obtained at the first electronic device.

13. The first electronic device of claim 8, wherein the processor is further configured to:
receive, from the connection management server, data for updating the token of the collaborative object, wherein the data for updating the token of the collaborative object is based on the second control input, as modified in response to the local constraint information of the first electronic device.

14. The first electronic device of claim 13,
wherein the second control input and local constraint information of the first electronic device do not permit a load balancing solution for provisioning the collaborative object, and
wherein the second control input is modified to satisfy the load balancing solution for provisioning the collaborative object.

15. A non-transitory computer-readable medium, comprising instructions, which when executed by a processor, causes a first electronic device to:

connect to a connection management server communicatively connected to a plurality of electronic devices,
execute an instance of a video conferencing application, wherein the video conferencing application obtains first image data and first audio data from the first electronic device and transmits the obtained first image data and first audio data to the connection manager server,
launch a first instance of a collaborative user interface (UI), wherein the first instance of the collaborative UI is presented at a display of the first electronic device in conjunction with the video conferencing application,
send local constraint information of the first electronic device to the connection manager server, wherein the local constraint information of the first electronic device comprises a constraint on a collaborative object specific to a geographic location of the first electronic device,
receive from the connection manager server, data associated with the collaborative object, wherein the data associated with the collaborative object comprises local constraint information of a second electronic device and a first control input received through a second instance of the collaborative UI launched at the second electronic device, wherein the local constraint information of the second electronic device comprises a constraint on the collaborative object specific to a geographic location of the second electronic device,
modify at least one parameter of the first instance of the collaborative UI and the second instance of the collaborative UI by removing one or more user input options from the first instance of the collaborative UI and the second instance of the collaborative UI based on the local constraint information of the first electronic device and the local constraint information of the second electronic device, wherein the local constraint information of the first electronic device comprises one or more location specific rules associated with a provision of the collaborative object among the collaborators, or a forecasted load on one or more resources for provisioning the collaborative object among the collaborators,
display, through the first instance of the collaborative user interface, a token of the collaborative object, and
receive, through the first instance of the collaborative user interface, a second control input for updating the token of the collaborative object displayed at the second instance of the collaborative UI.

16. The non-transitory computer-readable medium of claim 15, wherein the local constraint information of the first electronic device comprises one or more of the geographic location of the first electronic device, or information as to network bandwidth at the first electronic device.

17. The non-transitory computer-readable medium of claim 15, further comprising instructions, which, when executed by the processor, cause the first electronic device to:
analyze the obtained first image data to identify coordinate values of one or more predefined user features within the obtained first image data,
define an interaction window within the obtained first image data based on the identified coordinate values of the one or more predefined user features,
normalize a view of the obtained first image data in the first instance of the collaborative UI based on the identified coordinate values of the one or more predefined user features, and transmit the normalized view of the obtained first image data to the connection management server for normalizing the view of the obtained first image data in the second instance of the collaborative UI.

18. The non-transitory computer-readable medium of claim 17, further comprising instructions, which, when executed by the processor, cause the first electronic device to:
- obtain second image data, wherein the second image data captures a movement of a user within the interaction window,
- analyze the second image data to obtain a classification of the movement of the user within the interaction window, wherein the classification is associated with a user input, and
- transmit the user input to the connection manager server for updating the token of the collaborative object to be displayed in the first and second instances of the collaborative user interface.

19. The non-transitory computer-readable medium of claim 15, wherein the token comprises a graphical representation of a physical collaborative object, and
- wherein the graphical representation comprises one or more tags of content comprising image data obtained at the first electronic device.

20. The non-transitory computer-readable medium of claim 15, further comprising instructions, which when executed by the processor, cause the first electronic device to:
- receive, from the connection management server, data for updating the token of the collaborative object, wherein the data for updating the token of the collaborative object is based on the second control input, as modified in response to the local constraint information of the first electronic device.

* * * * *